(12) United States Patent
Capraro

(10) Patent No.: US 8,023,808 B2
(45) Date of Patent: Sep. 20, 2011

(54) HEAT TRANSFER DEVICE

(75) Inventor: Duilio Capraro, Conegliano (IT)

(73) Assignee: I.R.C.A. S.p.A. - Industria Resistenze Corazzate E Affini, San Vendemiano (IT)

( * ) Notice: Subject to any disclaimer, the term of this patent is extended or adjusted under 35 U.S.C. 154(b) by 522 days.

(21) Appl. No.: 12/301,227

(22) PCT Filed: May 16, 2007

(86) PCT No.: PCT/IB2007/001274
§ 371 (c)(1),
(2), (4) Date: Nov. 17, 2008

(87) PCT Pub. No.: WO2007/135519
PCT Pub. Date: Nov. 29, 2007

(65) Prior Publication Data
US 2009/0310951 A1    Dec. 17, 2009

(30) Foreign Application Priority Data

May 18, 2006    (IT) .............................. VE20060016 U

(51) Int. Cl.
*F24H 1/10*    (2006.01)
*H05B 3/58*    (2006.01)
(52) U.S. Cl. .......................... 392/465; 392/480; 392/484
(58) Field of Classification Search ........... 392/465–495
See application file for complete search history.

(56) References Cited

U.S. PATENT DOCUMENTS

| | | | | |
|---|---|---|---|---|
| 2,190,494 A * | 2/1940 | Templin | .......................... | 72/377 |
| 3,247,359 A * | 4/1966 | Feld et al. | ..................... | 392/480 |
| 3,949,189 A * | 4/1976 | Bilbro et al. | .................. | 392/468 |
| 3,953,923 A * | 5/1976 | Rygmyr | .......................... | 29/611 |
| 4,095,086 A * | 6/1978 | Ohnmacht et al. | ............ | 392/467 |
| 4,206,341 A * | 6/1980 | Leuschner et al. | ............ | 392/467 |
| 4,356,381 A * | 10/1982 | Flaherty et al. | ............... | 392/467 |
| 4,412,373 A * | 11/1983 | Kosonen et al. | ......... | 29/890.044 |
| 4,558,205 A * | 12/1985 | Bleckmann | .................. | 392/467 |
| 4,644,140 A * | 2/1987 | Hillinger | ...................... | 219/535 |
| 4,778,977 A * | 10/1988 | Bleckman | ..................... | 392/480 |
| 4,792,661 A * | 12/1988 | Schmidtchen et al. | ....... | 392/495 |
| 4,825,042 A * | 4/1989 | Hauslein | ...................... | 392/467 |
| 4,980,537 A * | 12/1990 | Knauss | ......................... | 392/459 |
| 5,150,448 A * | 9/1992 | Salomon | ....................... | 392/480 |
| 6,250,259 B1 * | 6/2001 | Herz et al. | .................... | 122/511 |
| 6,327,429 B1 * | 12/2001 | Chan | ............................ | 392/483 |
| 6,724,985 B2 * | 4/2004 | Matsunaga et al. | .......... | 392/480 |

FOREIGN PATENT DOCUMENTS

| | | |
|---|---|---|
| DE | 35 42 507 A1 | 6/1987 |
| FR | 2 295 391 A2 | 7/1976 |
| FR | 2 451 143 A | 10/1980 |
| GB | 547 830 A | 9/1942 |
| GB | 1 427 586 A | 3/1976 |

* cited by examiner

*Primary Examiner* — Thor Campbell
(74) *Attorney, Agent, or Firm* — Sampson & Associates, P.C.

(57) ABSTRACT

A device for transferring heat to a fluid with a heat generator comprising an electric resistance inserted in a first pipe integrally connected to a second pipe in which the fluid flows. The second pipe may comprise a steel tube coaxially inserted inside. First and second pipes are obtained inside a single block by means of an extrusion process.

17 Claims, 2 Drawing Sheets

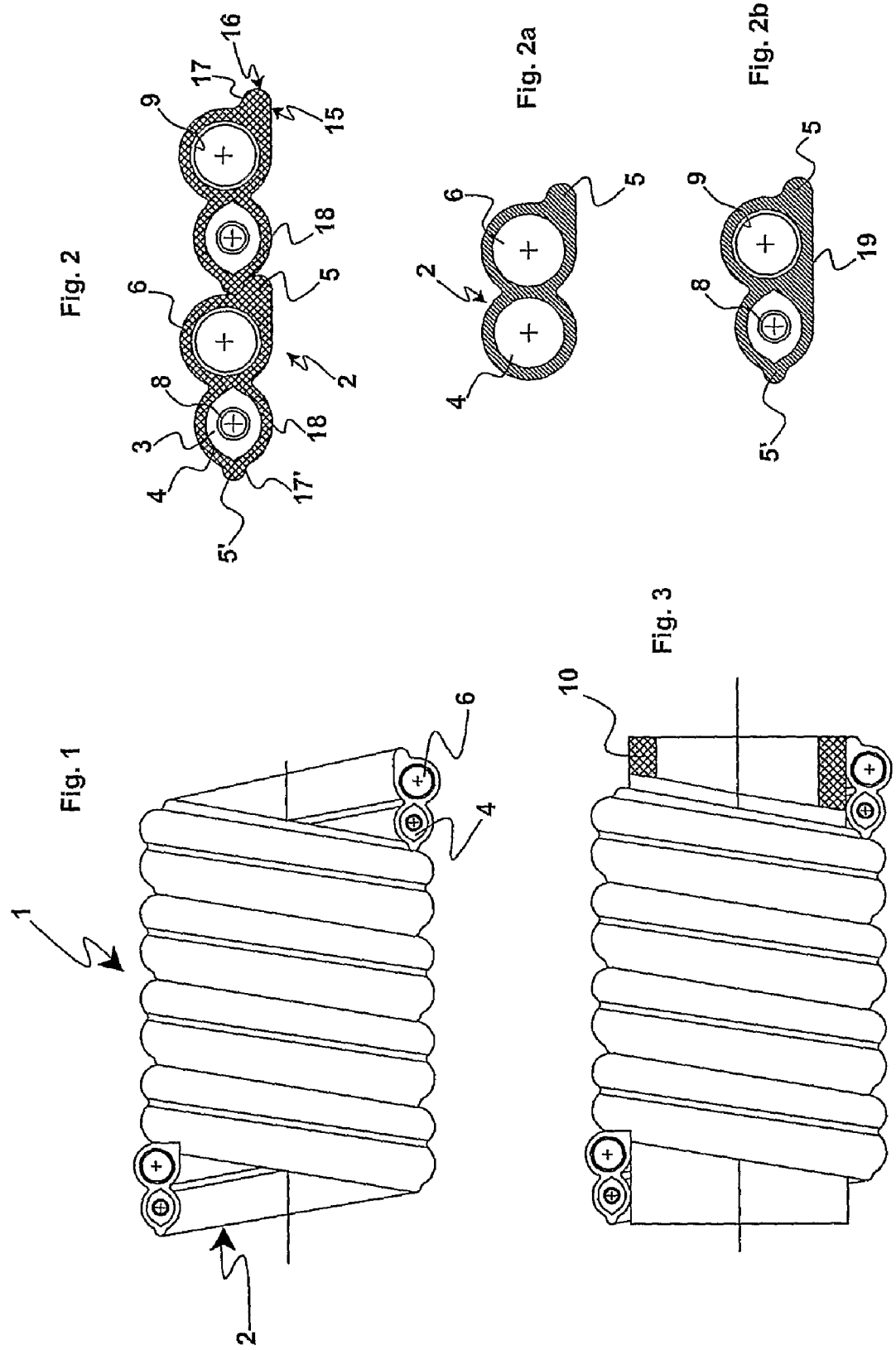

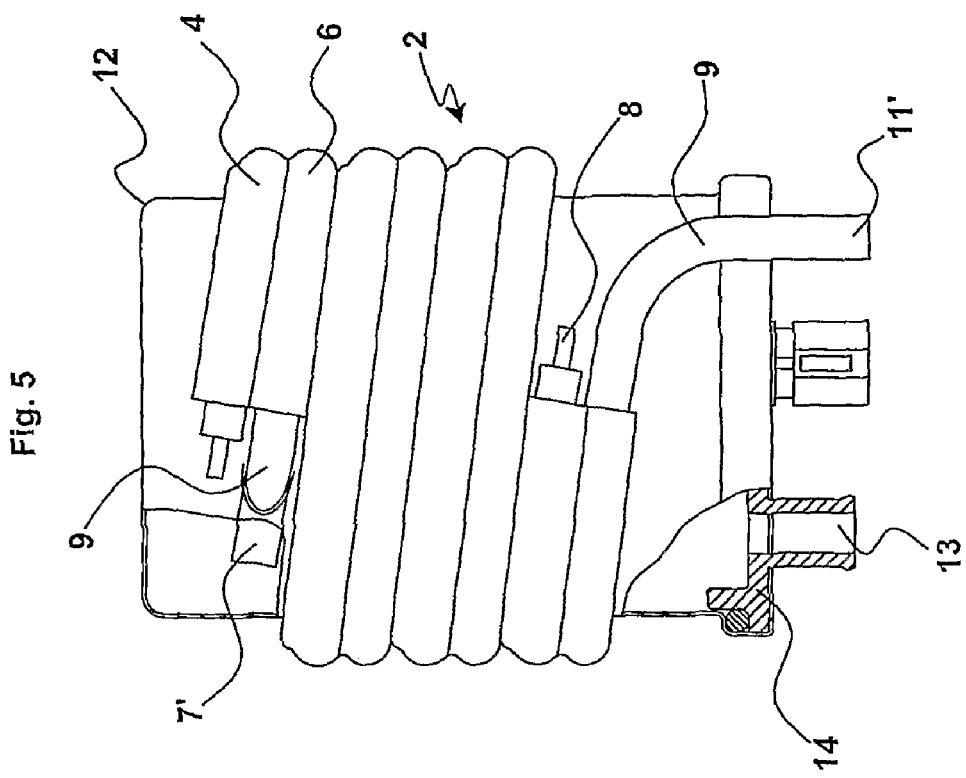
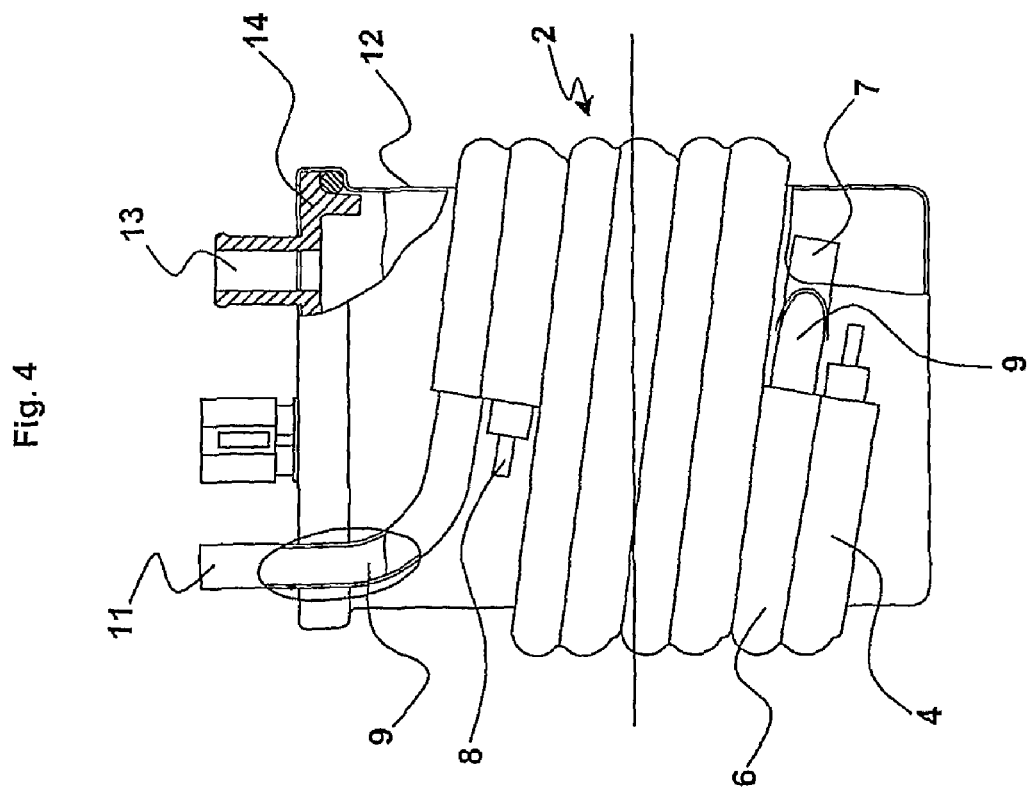

HEAT TRANSFER DEVICE

FIELD OF THE INVENTION

The present invention relates to a heat transfer device, specifically to a heat exchanger used in household appliances for the generation of hot water or steam.

STATE OF THE ART

Heat exchangers, or simply heaters, incorporating electric resistance inserted within a tube or casing are used in household appliances, e.g. coffee machines. Specifically, heat transfer devices consisting of a tube which internally accommodates a resistive wire or resistance, constituting the heating element, and of a steel tube for the passage of the water to be heated, are known. Both the heating tube and the water passage tube are helical-wound to reduce dimensions and are inserted in a die in which an aluminium casting is introduced. A thermal block consisting of an armoured heating element, a steel tube for water passage and an aluminium alloy which facilitates the heat exchange between heating element and tube in which the water flows is thus obtained.

Such heat transfer devices however present some drawbacks and specifically:
- a high cost for making dies for co-stamping the aluminium casting and the two helical wound tubes,
- a high cost of materials due to the large amount of aluminium required to obtain a satisfactory heat exchange between resistance and water passage tube with consequent high thermal inertia,
- difficulty in assembling the resistance, the water passage tube and the aluminium casting,
- a poor versatility due to the large mass and the consequently high heating times.

A further disadvantage is represented by the fact that the heating element is separately made, using a steel tube within which a resistance is provided, later introduced into the aluminium extrusion. The aluminium extrusion and the steel heating element are then placed in reciprocal direct contact by pressing to obtain a good thermal exchange. It is known that thermal expansion of aluminium is at least twice that of steel. Therefore, the direct contact can never be optimal.

It is thus felt the need to make a heat transfer device which allows to overcome the aforesaid drawbacks.

SUMMARY OF THE INVENTION

The primary object of the present invention is to make a heat transfer device which is versatile, easy to assemble and which presents low manufacturing costs. A further object of the invention is to provide a particularly rapid and economic production method of said heat transfer device.

The present invention thus suggests to reach such objects by producing a heat transfer device for transferring heat to a fluid which, according to claim 1, comprises a longitudinal extruded block, having an essentially eight-shaped cross section, internally provided with a first pipe in which there is provided a resistive heating element and with a second pipe suitable for the passage of the fluid to be heated, wherein at a side of the first pipe opposite to the contact side with the second pipe there is provided a first longitudinal side protuberance, formed by pressing of the block, and at a side of the second pipe opposite to said side of the first pipe there is provided a second longitudinal side protuberance, said longitudinal protuberances being arranged so that they are overlapped in a helical-wound configuration of the device.

Advantageously, in a first alternative embodiment of the device of the invention said second protuberance comprises:
- a first surface segment defining a first helical surface defining a cylindrical body, in a helical-wound configuration of the device;
- and a second surface segment having a profile portion suitable to mate with a surface portion profile of the first protuberance.

The first pipe, housing the resistive element, is provided with a flattened surface segment defining, in a helical-wound configuration of the device, a second helical surface defining the cylindrical body itself.

In a second alternative embodiment, instead, there is provided an external surface segment of the device defining a single helical surface defining a cylindrical body in a helical-wound configuration of the device itself.

The helical-wound device may be applied onto a fluid passage sleeve, e.g. a pipe or a container/boiler.

According to a further aspect of the invention, said heat transfer device is manufactured by means of the following production process of said device which, according to claim 13, comprises the steps of:
a) extruding a longitudinal block having an essentially eight-shaped cross section, internally provided with a first pipe and with a second pipe and externally provided with a side protuberance at a side of one of said pipes;
b) inserting an electric resistance (8) within the first pipe (4);
c) pressing the longitudinal block (2) to manufacture a further side protuberance (5') externally thereto at a side of the other one of said pipes (4, 6);
d) helical-winding the longitudinal block (2) so that said side protuberances (5, 5') are overlapped.

Advantageously, the process of the invention allows to obtain the aforesaid heat transfer device by reducing the amount of aluminium required to obtain a good thermal exchange between the two tubes, and thus reducing the thermal inertia. A smaller mass and the obtained shorter heating times imply a greater versatility of the device of the invention which may be applied, for example, to coffee machines, steam generators, hot water generators.

The dependent claims describe preferred embodiments of the invention.

BRIEF DESCRIPTION OF THE DRAWINGS

Further features and advantages of the present invention will be more apparent in the light of the detailed description of preferred, but not exclusive, embodiments, of a heat transfer device illustrated by the way of non-limitative example, with the aid of the accompanying drawing, in which:

FIG. 1 represents a side view of a heat transfer device according to the invention;

FIG. 2 represents a cross section of a part of the device in FIG. 1;

FIG. 2a represents a cross section of a part of the device in FIG. 1 obtained by the extrusion operation;

FIG. 2b represents a cross section of a part of an alternative embodiment of the device of the invention;

FIG. 3 represents the device in FIG. 1 wound about a thermal mass;

FIG. 4 represents a first use mode of the device of the invention;

FIG. 5 represents a second use mode of the device of the invention.

DETAILED DESCRIPTION OF PREFERRED EMBODIMENTS OF THE INVENTION

FIG. 1 shows a heat transfer device, globally indicated by reference numeral 1, used in various household appliances for the generation of hot water or steam. Such device advantageously comprises a single extruded block 2, preferably formed by aluminium or other suitable material, having an essentially eight-shaped cross section, which internally presents at least two pipes, reciprocally separated by a small aluminium mass to reduce the thermal inertia to the maximum extent. As shown in greater detail in the section in FIG. 2, a first pipe 4 accommodates a resistive element, comprising an electric resistance 8 which acts as heating element; a second pipe 6 may accommodate a tube 9, preferably but not necessarily formed by steel, suitable for the passage of a fluid, generally the water to be heated. Tube 9 is coaxially inserted inside second pipe 6 of extruded block 2 so that there is a direct contact between them to further improve the heat exchange.

The water to be heated may flow into second pipe 6 directly in contact with the aluminium or aluminium alloy or other suitable material, thus without providing the steel tube 9.

Electric resistance 8 is, for example, helical-shaped but it may be made in other shapes. Space 3 between the internal surface of first pipe 4 and electric resistance 8 is filled with an electrically insulating material, e.g. magnesium oxide in granule form, which however performs the function of transferring heat outwards.

Advantageously, the solution of the invention provides inserting electric resistance 8 directly into pipe 4 of aluminium extrusion 2, eliminating the steel tube in which this is provided in the devices of the state of the art and obtaining an optimal thermal exchange.

In a preferred embodiment, second pipe 6 has a circular section while first pipe 4 has an essentially elliptical-shaped section and is preferably provided along its extension with pointed protrusions at the ends of the major axis of the ellipse. This specific embodiment is obtained by pressing to compact the magnesium oxide and improve the resistance-extrusion heat exchange.

As shown in the section view in FIG. 2, extruded block 2 is advantageously provided with a first edge or longitudinal side protuberance 5', obtained by pressing the extrusion and arranged at the pointed longitudinal protrusion of first pipe 4, and with a second edge or longitudinal side protuberance 5, obtained by extrusion and externally arranged at second pipe 6 so that, once longitudinal extruded block 2 is helical-wound, first and second edges 5, 5' overlap and mate so as to possibly be fastened by brazing in order to improve the heat exchange. A first preferred alternative embodiment, with reference to the section view in FIG. 2, provides that the second longitudinal edge 5 comprises a curvilinear surface segment 16 and a flat surface segment 15 defining a first helical resting surface, when block 2 is helical-wound to make the device according to the invention, so as to increase the contact surface between device of the invention and a cylindrical sleeve in which the fluid to be heated flows. The sleeve, formed by conductive material, may for example be part of a pipe or a container/boiler. Advantageously, curvilinear surface segment 16 presents a portion 17 having a profile suitable for mating with a portion 17' of the first longitudinal edge 5' when block 2 is helical-wound.

The pressing operation of the extruded block 2 of FIG. 2a allows to make the first longitudinal edge 5' and to obtain the oval or essentially elliptical section of first pipe 4. This flattening, starting from the circular section of pipe 4 obtained by extrusion (FIG. 2a), allows to obtain a flattened surface segment 18 (FIG. 2) defining a second helical resting surface to facilitate the application of the device of the invention onto a cylindrical sleeve when block 2 is helical-wound.

In a further alternative embodiment of the device, a section of which is shown in FIG. 2b, there is provided a single contact surface segment 19 defining, in a helical winding of block 2, a single helical resting surface comprising the aforesaid helical surfaces defined by surface segments 15 and 18.

Further alternative embodiments of the device of the invention can provide that the two longitudinal side edges 5, 5' are arranged in different end portions from those of FIG. 2, e.g. both arranged at the surface passing through the longitudinal protrusions of pipe 4 and slightly offset with respect to each other.

In the use mode of the device of the invention shown in FIG. 3, for example, helical-wound extruded block 2 is coaxially applied and brazed onto a sleeve 10, e.g. formed by aluminium, having the function of thermal mass and inside which a fluid to be heated flows. The same fluid or two different fluids to be heated may flow through sleeve 10 and tube 9, or simply sleeve 10 and second pipe 6, according to the type of application of the device of the invention.

Two different operating modes are shown in FIGS. 4 and 5, in which extruded block 2 is wound and brazed onto a container 12, formed by steel with removable lid 14, acting as a boiler. Specifically, while first pipe 4 comprising resistance 8 is always outside container 12, an end 7, 7' of steel pipe 9 housed in second pipe 6 enters inside said container.

In the operating mode shown in FIG. 4, the heat transfer device of the invention is applied onto container 12 provided with a lid 14 on the upper part. The water to be heated enters container 12 through the opening 13 of the lid. The heating of the water and of the container by resistance 8 causes an increase of the water temperature and thus of the pressure inside the container which makes the superheated water flow from upper end 11 of tube 9, provided with a lower end 7 housed within container 12 which acts as water intake. In this case, the device of the invention works as hot water generator and may be applied to household appliances, such as, for example, coffee machines. The heating element has the two-fold function of heating the water in the container/boiler and in outlet tube 9. Control means of the fluid temperature, of the pressure inside the container and of the fluid flow may be provided on lid 14.

In the operating mode shown in FIG. 5, the heat transfer device of the invention is applied onto container 12 provided with a lid 14 on the lower part.

The water to be heated enters container 12 through the opening 13 of lid 14 and the water level is maintained underneath upper end 7' of tube 9. Such upper end 7' is housed within container 12 and acts as steam intake once the water starts evaporating. The heating of the water and of the container by resistance 8 has indeed the effect of producing steam which is superheated and spontaneously released by lower end 11' of tube 9.

In this case, the device of the invention operates as steam generator and may be applied to different household appliances which provide the steam generation function. The heating element has the two-fold function of heating the water in the container/boiler until it is made to evaporate and then of heating the steam in the outlet tube 9. Also in this case, control means of the fluid temperature, of the pressure inside the container and of the fluid flow may be provided on lid 14.

In both cases, if tube 9 is not provided, ends of second pipe 6 will be housed within container 12 to acts as water or steam intakes.

Advantageously, the production process of be above-described heat transfer device provides the following steps:
extruding a longitudinal block 2, preferably formed by aluminium, having an essentially eight-shaped cross section, internally provided with a first pipe 4 and with a second pipe 6 and externally provided with a side edge 5 at said second pipe 6;

inserting an electric resistance 8 inside first pipe 4 of extruded block 2;

inserting an electrically insulating material inside said first pipe 4 between the internal surface of the pipe itself and the electric resistance;

possibly inserting a tube 9, preferably formed by steel, inside second pipe 6 of extruded block 2;

pressing extruded block 2 to externally make a further side edge 5' at first pipe 4, in order to compact the electrically insulating material inside said first pipe 4 and to possibly improve the contact between tube 9 and second pipe 6;

helical-winding extruded block 2 so that second side edge 5' may be overlapped over first side edge 5.

FIG. 2*a* shows a cross section of extruded block 2 before the pressing operation. It is observed that first pipe 4 has a circular section, as obtained from the extrusion operation.

The overlapping of side edges 5, 5' allows to braze the turns onto each other. In this manner, second pipe 6 crossed by water is optimally heated on both sides. Indeed, once side edges 5, 5' are overlapped, they may be simply fastened by brazing so as to optimise the heat exchange between resistance 8 and tube 9 or water passage pipe 6.

The device of the invention may be easily applied to sleeves, pipes or containers in which the fluid to be heated flows.

The invention claimed is:

1. A heat transfer device for transferring heat to a fluid comprising a longitudinal extruded block, having an essentially eight-shaped cross section, internally provided with a first pipe in which there is provided a heating resistive element and with a second pipe suitable for the passage of the fluid to be heated wherein at a side of the first pipe opposite to the contact side with the second pipe there is provided a first longitudinal side protuberance, formed by pressing of block, and at a side of the second pipe opposite to said side of first pipe there is provided a second longitudinal side protuberance, said longitudinal protuberances being arranged so that they are overlapped in a helical-wound configuration of the device.

2. A device according to claim 1, wherein the second protuberance comprises a first surface segment defining a first helical surface defining a cylindrical body in a helical-wound configuration of the device.

3. A device according to claim 2, wherein the second protuberance comprises a second surface segment having a profile portion suitable to mate with a profile of a portion (17') of the surface of the first protuberance.

4. A device according to claim 3, wherein the first pipe is provided with a flattened surface segment defining a second helical surface defining the same cylindrical body in a helical-wound configuration of the device.

5. A device according to claim 1, wherein there is provided a surface segment defining a single helical surface defining a cylindrical body in a helical-wound configuration of the device.

6. A device according to claim 1, wherein the second pipe has a circular section and the first pipe has an essentially elliptical shape section.

7. A device according to claim 6, wherein the first pipe is provided along its extension with pointed protrusions at the ends of the major axis of the ellipse.

8. A device according to claim 7, wherein the first protuberance is arranged at an external pointed longitudinal protrusion of the first pipe.

9. A device according to claim 1, wherein there is provided a tube coaxially housed in the second pipe so that there is a direct contact between tube and second pipe.

10. A device according to claim 1, wherein the longitudinal extruded block is formed by aluminium.

11. A device according to claim 9, wherein the tube is formed by steel.

12. A device according to any of the preceding claims, suitable to be helical-wound on a fluid passage sleeve.

13. A device according to claim 12, wherein said fluid passage sleeve is a pipe.

14. A device according to claim 12, wherein said fluid passage sleeve is a container/boiler and ends of the second pipe are housed within the container/boiler to act as water or steam intakes.

15. A production process of a heat transfer device according to claim 1, comprising the following steps:

a) extruding a longitudinal block, having an essentially eight-shaped cross section, internally provided with a first pipe and with a second pipe and externally provided with a side protuberance at a side of one of said pipes;

b) inserting an electric resistance within the first pipe;

c) pressing the longitudinal block to manufacture a further side protuberance externally thereto at a side of the other one of said pipes;

d) helical-winding the longitudinal block so that said protuberances are overlapped.

16. A process according to claim 15, wherein before step c) there is provided an insertion of an electrically insulating material inside the first pipe.

17. A process according to claim 15, wherein before step c) there is provided a coaxial insertion of a tube within the second pipe in reciprocal direct contact.

* * * * *

UNITED STATES PATENT AND TRADEMARK OFFICE
CERTIFICATE OF CORRECTION

PATENT NO. : 8,023,808 B2  Page 1 of 1
APPLICATION NO. : 12/301227
DATED : September 20, 2011
INVENTOR(S) : Duilio Capraro It is certified that error appears in the above-identified patent and that said Letters Patent is hereby corrected as shown below:

Column 6, after line 50, please insert lines, -- 18. A process according to claim 16, wherein before step c) there is provided a coaxial insertion of a tube within the second pipe in reciprocal direct contact. --

Signed and Sealed this
Third Day of April, 2012

David J. Kappos
*Director of the United States Patent and Trademark Office*